Dec. 4, 1928.
A. L. WEBRE
1,693,629
NONCLOGGING SPRAY NOZZLE
Filed Aug. 23, 1922
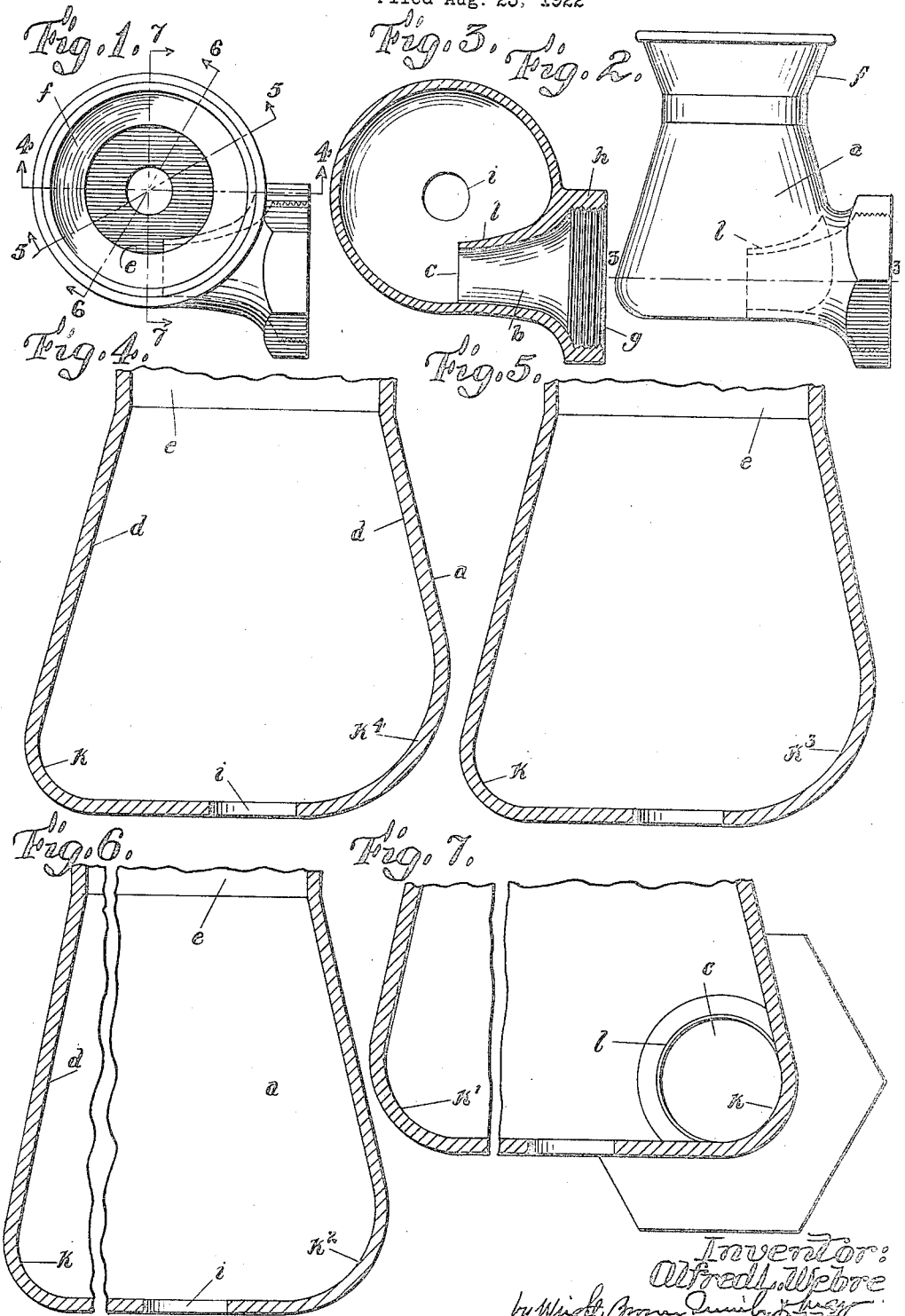

Patented Dec. 4, 1928.

1,693,629

UNITED STATES PATENT OFFICE.

ALFRED L. WEBRE, OF WINCHESTER, MASSACHUSETTS, ASSIGNOR TO E. B. BADGER AND SONS COMPANY, OF BOSTON, MASSACHUSETTS, A CORPORATION OF MASSACHUSETTS.

NONCLOGGING SPRAY NOZZLE.

Application filed August 23, 1922. Serial No. 583,680.

The present invention relates to nozzles by which water or other sufficiently fluid liquid may be discharged as a spray of finely divided particles. Such nozzles are commonly used in circumstances where it is required either to moisten air, or to cool considerable quantities of water as rapidly as possible by evaporation and contact with air in open spaces. An instance of such a use is the familiar spray pond equipment by which water which has been used for cooling purposes, for condensing steam and for other purposes, is itself cooled.

Although the utility of the present invention is not limited to the spraying of water, nevertheless in the following specification I will, in the interest of brevity, in describing the purpose and function of my nozzle assume that water is the liquid treated, water then being considered as typical of any liquid which may be sprayed by means of a nozzle having the characteristics hereinafter described and claimed.

The main object of the invention is to furnish a nozzle which will be free from liability of becoming clogged by solid matter carried by the water entering it, (particularly matter in the nature of long fibers or stringy material, such as the vegetation which grows on the shores of spray ponds); and at the same time to obtain by such nozzle a better character of spray, with a subdivision of the water into particles of more uniform size, and generally smaller size, than has been obtained by spraying devices of the kinds heretofore known.

The non-clogging function is of particular importance in connection with nozzles used for spraying water (in order to cool it) which has already been used for cooling purposes. Frequently water available for this purpose contains more or less vegetable matter and sediment which is unable to pass through the narrow waterways of those nozzles which are equipped with interior vanes and other obstructions designed to induce a whirling motion in the flowing water or for causing impingement of streams on one another, to produce spray, wherefore such nozzles eventually become clogged by the arrested matter.

Correct design and efficient operation of a spray cooling equipment require that the number of nozzles be neither more nor less than that which best transform into spray, under pressure available with best economy for spraying it, the quantity of water required to be cooled, and that all the nozzles so provided be in condition to operate at their full capacity all the time. If an excessive number of nozzles be provided in order to allow for later clogging of some of them, the pressure at each nozzle, before any of them become clogged, will be too low to atomize the water fully enough and distribute it widely enough, for good cooling effect. On the other hand, if the number of nozzles is fixed without allowance for clogging and some of them become clogged, then either greater pressure must be supplied (at increased expense) in order to spray a given quantity of water, or the quantity of water circulated will be diminished and the cooling effect to that extent also diminished.

The manner in which I have accomplished the objects above stated and the characteristics of the invention to which I make claim can best be explained in connection with the description in detail of a form of nozzle which has been proved to be satisfactory. Such description follows, and therein reference is made to the accompanying drawings in which,—

Figure 1 is a plan view of the nozzle referred to.

Figure 2 is a side elevation of the nozzle.

Figure 3 is a horizontal section on line 3—3 of Figure 2.

Figures 4, 5, 6 and 7 are vertical sections on lines 4—4, 5—5, 6—6 and 7—7, respectively, of Figure 1, but being represented on a larger scale than that of the preceding figures.

Like reference characters designate the same parts wherever they occur in all the figures.

The nozzle particularly illustrated in the foregoing figures and hereinafter described embodies the same fundamental principles as the nozzle disclosed in my prior application for Letters Patent of the United States filed July 20, 1921, Serial No. 486,094, but contains certain improvements in design and a new feature in means for automatically draining the nozzle. As to all common subject-matter this application is a continuation of the preceding one above named, the application date of which is claimed as that of constructive reduction to practice of such common subject matter.

Structurally the nozzle comprises a main or body portion $a$ which, for convenience of description, may be called a bowl, in the sense that it is hollow and is generally circular in all planes perpendicular to a given longitudinal line. This body or bowl departs from the substantially circular cross-sectional form, as more fully pointed out hereinafter, in the part or zone where the inlet enters. It has an inlet passage or admission channel $b$ entering tangentially in the angle between its end and side walls, and terminating in an admission or primary orifice $c$. Having regard to the position in which the nozzle is shown in the drawing, and in which it is generally, although not exclusively used, I shall, in the following description, generally refer to the above mentioned end wall as the bottom wall, or bottom, of the bowl. The side walls $d$, $d$ of the bowl are substantially conical, converging upward to a zone $e$ of minimum diameter and thence diverging by way of an inverted conical zone $f$. For the purposes of this description, the opening within the zone $e$ may be considered as the discharging or secondary orifice, for it is the relation of this orifice to the admission orifice which is material in securing the desired quality of spray and avoiding liability of clogging, and the flaring terminal flange is substantially a guide for the outflowing water and is limited as to its flare angle and the diameter of its terminal opening by the diameter of the secondary orifice $e$.

Referring again to the inlet channel, the latter has an entrance opening $g$ which is of larger diameter than the primary orifice, and the walls of the channel taper from the larger opening to the smaller one on a curve of uniform acceleration. At least this is the preferred formation in order that a high acceleration may be imposed on the incoming jet of water with the greatest efficiency, although departure may be made from this specific form within the scope of the protection which I claim for the invention. An external flange $h$ surrounds the entrance opening $g$ and is internally threaded to permit mounting of the supply pipe, this being one embodiment of means for that purpose, typical and illustrative of the many other means for the same purpose which might be used.

In or near the center of the bottom wall of the nozzle is an opening or hole $i$ to permit escape of heavy solid particles which might enter the nozzle and also to permit automatic and instant draining when the supply is shut off. This hole is not a spray outlet, however, but is small enough in diameter and located so near the center, that the water forced through the nozze whirls around the hole and does not pass through it in any considerable quantity when the nozzle is in operation.

The nozzle as thus described is preferably made as a single integral casting of metal, such as bronze, although it may be made in a number of pieces assembled together and of any suitable material, within the scope of the invention.

The non-clogging function of this nozzle is made possible by two facts; first, that there are no internal obstructions to the passage through the nozzle of any foreign matter which might pass the primary orifice, and second, that the secondary orifice is as large as the primary orifice, and preferably is larger. Clogging of the primary orifice, of course, is prevented by suitable strainers placed at the entrance to the supply pipe and adapted to exclude rigid particles of dimensions as large as this orifice, and by the smoothly tapered walls of the admission channel which offer no obstructions on which any soft, flexible, stringy material that might pass the strainer can lodge.

The primary orifice, which is the smallest constriction in this nozzle, being two or more times as large in diameter or width as the narrowest constriction of other nozzles of equal capacity hitherto used, permits free passage of matter which would clog such other nozzles; wherefore, apart from any question of strainers before the entrance to the spray system, my nozzle is free from liability to clog in circumstances where clogging of other nozzles would result.

A very common cause for the clogging of nozzles which are equipped with vanes is the accumulation of stringy matter long enough to be caught by bending around the vanes, or bits of other matter small enough in one dimension to pass through the strainers, but long enough to bridge across the narrow waterways between the vanes, whereby the waterways eventually become stopped. Obviously nothing of the sort can occur with my nozzle. Any sort of stringy material which is liable to be present in the water is so light in weight that it is carried out of the secondary orifice by the flowing stream, while stones and other pieces of heavy matter small enough to pass the external strainers are likewise small enough to pass the secondary orifice, and usually to pass through the bottom hole as well.

In practice I have found that the best results in spraying are obtained when the secondary orifice is two or three times as large in diameter as the primary orifice. With so great an excess of outlet area, evidently there is free outlet for any solid matter which may enter the bowl.

It is important when the nozzles are arranged to spray water for cooling it, that the spray be delivered uniformly at all sides, and that it have a substantial component of velocity axially toward the outlet, as well as a radial component of velocity, which axial component should be equal, or nearly so, to the radial component in order to give the longest possible trajectory to the drops of which the spray is composed. These results depend, in the absence of any guide vanes or other internal means for creating spray, mainly on the correct shape of the junction between the bottom and side walls, forming the channel into which water is first admitted, and on the convergent taper of the side walls from this channel to the zone which bounds the outlet orifice. Other factors contributing to the desired end are the arrangement of the inlet passage and the ratios of the primary orifice to the largest diameter of the bowl, to the diameter of the secondary orifice, and to the distance between the primary and secondary orifices.

The bottom is plane in the central part, but joins the side walls on a curve having the same radius as the primary orifice, in the parts designated $k$ in Figures 4 to 7. The admission passage $b$ merges in its outer and lower parts with the curved junction wall $k$, and its inner and upper parts are bounded by a partition $l$ which preferably extends into the bowl far enough to bring the plane of the primary orifice $c$ nearly radial to the bowl. In other words, the preferred length of the inner boundary of the inlet passage within the bowl is that which locates the primary orifice in a plane perpendicular to its axis, and so near to that radius of the bowl which also is perpendicular to such axis, that the stream of water issuing from the orifice has no opportunity to spread before being diverted into a circular path by the walls of the bowl.

The conformity of the curvature $k$ with the orifice $c$ continues through half, more or less, of the circuit of the bowl from the orifice, or nearly to the intersection of plane 7—7 with the opposite side of the bowl; and thereafter, through the remainder of the circuit to the partition $l$, the radius of the curved junction wall, which forms the boundary of the channel through which water flows in making the first circuit of the nozzle, is progressively lengthened and its center of curvature progressively elevated and drawn inward toward the axis of the bowl, as will be evident from a comparison of the curves $k^1$, $k^2$, $k^3$ and $k^4$ in Figures 7, 6, 5 and 4, respectively. This characteristic may be expressed in terms of geometry, as that the locus of the successive centers of transverse curvature of the lower water channel, is a circular arc through the first part of the circuit of the bowl, and through the remainder of the circuit is an ascending and contracting spiral, so located that the arcs of progressively increasing radius centered on this locus are tangent to the bottom and side walls of the bowl.

It should be noted, however, that the foregoing statements are not intended to define any particular or exact progression of centers and radii, but are to be construed as indicating in a general way the relation existing between the parts in question. What is practically important, is that the water channel is raised and widened in approaching the inner wall $l$ of the inlet passage after making the circuit of the bowl, whereby the water stream is mainly raised above the entering jet, and that the surfaces of the channel merge with the channel partition on smooth stream line curves. Thus the water which has passed once around the bowl is caused to join and flow beside the entering stream without interference or formation of wasteful eddy currents. At the same time, the water is impelled toward the outlet in a spiral path, and is permitted to spread gradually under the pressure of centrifugal force into a film conforming to the conical walls. Although a small part of the water passes under the inward bulge of the partition $l$, this part merely fills the space between the entering jet and the bottom wall without having any substantial diverting or impeding effect on such jet. Hence the initial velocity of the water is maintained substantially without retardation, other than that due to friction on the surrounding walls.

The high velocity of the whirling water, produced by the inflowing jet, creates centrifugal force of large magnitude which holds the water against the outer walls, leaving the middle of the bowl empty, and applies pressure through the water in all directions, except inwardly, with the effect of raising the water through the outlet. This latter effect is augmented by the deflecting action of the nozzle bottom. The water does not fill the outlet, but passes through it in an annular film of which the thickness is determined by the difference between the areas of the primary and secondary orifices and by the velocities of the water passing these orifices. After passing the secondary orifice, such film leaves the nozzle as a cone, the angle of which is dependent on the resultant of centrifugal force and the axial velocity of the water, and on the surface tension of the water, and is also influenced to some extent by the flare angle of the terminal lip $f$. Further spreading, the film becomes more and more attenuated until it finally breaks into a spray.

Remarkably close uniformity in the size of the drops forming the spray and a remarkably even distribution of spray around the nozzle, both highly desirable effects, result from uniformity in the thickness of the water film passing the outlet, and this, in turn, is obtained by the character of motion given to the water in the bowl, as already explained.

The proportions of the various parts of the particular nozzle herein shown and described are believed to have a contributory influence in obtaining the effect previously described, and to secure other useful results as well. Thus the height from the bottom of the nozzle to the secondary orifice is comparatively small in proportion to the diameter of the primary orifice, being between three and four times as great; and the greatest diameter of the bowl is in approximately the same ratio to the primary orifice, while the diameter of the secondary orifice is between two and three times that of the primary orifice. It follows thence that the lift from the inlet to the outlet is low, the back pressure small, and friction a minimum, that the body of water in the nozzle requiring to be rotated by the incoming jet is small in proportion to the mass of the jet, that any single particle need make but a few circuits of the bowl before being discharged, that the inner diameter of the first circuit of the entering stream is less than the diameter of the outlet, wherefore no water need accumulate within such circuit before discharge can occur, and that the bottom of the bowl is free of water in its middle, which makes possible the provision of a central open hole without flow of water through such hole when the nozzle is in operation.

It should be noted that the proportions just given are not exact limitations of the invention, but may be more or less widely departed from within the scope in which I claim protection. Nevertheless they are important and valuable features on account of the improved effects in spraying and the economies of first cost and in operation which result from them. As to the item of low first cost, it will be noted that the whole nozzle may be made as a single casting, requiring little finishing beyond cutting the attachment thread and possibly reaming the inlet passage, and that the form of such casting is an inexpensive one to produce. Besides, the large flow capacity in proportion to the mass of material composing the individual nozzle, and freedom from liability to clog, make it possible to provide continuously effective equipment for spraying a given quantity of water in a given time, with a minimum number of nozzles.

The tangential inlet at the bottom, enables the nozzle to be applied to the end of a horizontal pipe without requiring such pipe to be bent upwardly or provided with an upstanding section, and thus enables the nozzle to be located close to the surface of the pond when used as part of spray cooling equipment. An important advantage results from this relatively low position of the nozzle, in that, with a given pressure head, more water can be forced through the nozzle and transformed into a finer spray and driven higher above the outlet and spread more widely, than is possible with the use of nozzles having an axial inlet, which must be mounted on upturned or upright pipes and, therefore, cannot practicably be located so near the surface of the pond. Or a lift and spread of spray equivalent to that from the axial inlet nozzle may be obtained from a lower pressure head, whereby power for pumping the water to the spray system may be economized. Further economy of power results from the reduction of friction and of jet interference, due to the interior formation and absence of vanes or other obstructions in the nozzle, as previously set forth.

If it were not for the drain hole $i$ in the bottom of the nozzle, however, placement of the nozzle at the low level with respect to the surface of the pond, as just described, would not be possible with safety in climates where the occurrence of low temperatures require the nozzle and piping to be emptied of water, when shut down, in order to avoid damage by freezing, or where other conditions require emptying at such times. The branch pipe arms may be connected to the under side of the mains and led with a downward pitch to the nozzles mounted on their extremities, wherefore all the piping, as well as the nozzles themselves, will be automatically drained through the nozzle drain-hole at once when the water is shut off.

Although in the foregoing description I have explained the utility and advantages of the invention in relation to the use for which it is particularly designed, I desire it to be understood that my claims to protection are not limited to such use, but are intended to protect the novel and useful characteristics of the invention however they may be applied to use. It is to be further understood that various modifications in and departures from the particular embodiment of the invention herein described may be made within the scope of the invention and of the protection hereinafter claimed.

What I claim and desire to secure by Letters Patent is:

1. A spray nozzle comprising a hollow body of generally circular cross section in planes perpendicular to a longitudinal line, said body having a wall at one end, an outlet orifice adjacent to the opposite end, said orifice being substantially concentric with the body and of substantially larger area and dimensions than the after-mentioned inlet, and a tangential inlet adjacent to the end in which said wall is located, the side walls of the body being of tapered formation convergently from the part in which the inlet is located toward the outlet orifice.

2. A non-clogging spray nozzle comprising a bowl-like body having a wholly open interior with a tangential inlet at one end and an outlet at the opposite end, the outlet orifice being substantially concentric with the body and of substantially larger area and dimensions than the inlet orifice, and the body having an end wall adjacent to the inlet, and side walls of substantially conical formation joining the end wall at the largest diameter of such formation.

3. A spray nozzle comprising a hollow body free from interior obstructions and of generally circular cross section in planes perpendicular to a longitudinal line, said body having a tangential inlet adjacent to one end and an outlet orifice adjacent to the opposite end, said orifice being substantially concentric with the body and of substantially larger area and dimensions than the inlet, and having also an end wall adjacent to the inlet and side walls of tapered formation converging toward the outlet orifice, the side walls being joined with the end wall on a smooth curve, and the junction between the end and side walls in a part of the body being inclined toward the outlet orifice.

4. A non-clogging spray nozzle having an end wall and conically arranged side walls joined to the end wall and being convergently inclined thence to the outlet orifice, and the nozzle having an inlet passage entering tangentially at the junction between said end and side walls and terminating in a circular orifice of less diameter than the outlet orifice, which outlet orifice has a larger radius than the distance from the axis of the nozzle to the inner boundary of the inlet orifice.

5. A non-clogging spray nozzle comprising a hollow body with an open unobstructed interior, having its interior surface of substantially conical form converging substantially from an end wall to a restricted zone surrounding an outlet orifice, and having an inlet passage arranged substantially tangentially of said body adjacent to said end wall, the latter and said interior surface being formed to cause the liquid entering the nozzle to flow around said interior surface in the form of a spiral hollow stream of decreasing thickness to said outlet.

6. A spray nozzle having an end wall and tapered side walls which are joined to said end wall and are convergently inclined thence toward the outlet orifice, said nozzle having an inlet passage entering tangentially at the junction between said end and side walls, which passage has converging sides and terminates in a primary orifice of less area and dimensions than the outlet orifice; said primary orifice being within the nozzle and in a plane near and approximately parallel to the diametral plane of the nozzle which is perpendicular to the axis of said inlet passage.

7. A spray nozzle comprising a bowl-like body having an entirely open interior with a transverse wall at one end, an outlet orifice at the opposite end, side walls converging from their junction with the end walls toward said orifice, and a tangential entrance passage at said junction terminating in an orifice of less diameter than the outlet orifice, but the diameter of which is so great that the inner side of the stream issuing therefrom is not substantially further distant from the axis of the body than is the circumference of the outlet orifice.

8. A spray nozzle comprising a bowl-like body having an entirely open interior with a transverse wall at one end, an outlet orifice at the opposite end, side walls converging from their junction with the end walls toward said orifice, and a tangential entrance passage at said junction terminating in an orifice of less diameter than the outlet orifice, said junction having a transverse curvature of which the radius of curvature is approximately equal to that of the inlet orifice, in the first part of the circuit of the bowl from said orifice, and in the latter part of such circuit said radius of curvature becomes progressively longer.

9. A spray nozzle comprising a bowl-like body having an entirely open interior with a transverse wall at one end, an outlet orifice at the opposite end, side walls converging from their junction with the end walls toward said orifice, and a tangential entrance passage merging with said junction as to the outer part of its boundary wall and extending into the interior of the bowl as to the inner part of said boundary wall, having its termination in a circular orifice of less diameter than the outlet orifice; said junction having a transverse curvature of which the radius is substantially the same as that of the inlet orifice in the first part of the circuit of the bowl from said orifice, and increases in the last part of such circuit, whereby the channel for the flowing liquid stream is inclined toward the axis of the bowl and toward the outlet in its approach to the inner part of said boundary wall.

10. A spray nozzle having an end wall and side walls joining to form a channel, the side walls converging from said end wall toward an outlet orifice, an inlet passage arranged tangentially to the nozzle opening into said channel and having a terminal orifice smaller than said outlet orifice, said channel having a changing form tending to incline the stream flowing from said inlet, toward the outlet orifice and also inwardly toward the axis of the nozzle as such stream approaches the completion of its first circuit of the nozzle.

11. A spray nozzle comprising an open bowl having a transverse bottom and conical side walls tapering upwardly toward a discharge orifice, an inlet passage opening tangentially of the bowl into the channel formed by the junction between the bottom and side walls, said passage being of progressively diminishing area and terminating in an inlet orifice of less diameter than the discharge orifice, said orifice being in part bounded by the walls of said channel, and there being a partition extending into the nozzle and forming the remaining boundaries of the orifice, the bottom of such channel, in the circuit of the nozzle followed by the incoming water, being raised as it approaches said partition, whereby to direct the flowing stream over the entering jet and toward the outlet orifice.

12. A nozzle comprising a bowl having a transverse bottom and upwardly converging conical sides, the space included within the junction of said bottom and sides having a rounded contour and being a channel for entering water, an inlet passage extending tangentially into the nozzle and having an orifice within the bowl, a part of the boundary of which orifice substantially merges with the bounding wall of said channel, and said bounding wall having a transverse curvature of which the locus of the center of the curvature is substantially concentric with the axis and parallel to the bottom of the nozzle in the first part of the circuit of the nozzle and in the latter part of such circuit is an ascending and inwardly contracted spiral, the radius of curvature of such last part being progressively lengthened in accordance with the rise of such locus, whereby the channel is so formed as to direct the flowing water mainly above the incoming jet upon completion of the first circuit of the nozzle.

13. A nozzle comprising a bowl having a substantially flat bottom and conical sides converging upwardly to a discharge orifice of substantial diameter, an inlet passage opening tangentially of the bowl into the channel formed by the junction of the bottom and side walls and having a terminal orifice, the outer part of which is substantially coincident with the boundary of said channel, said nozzle having approximately the following proportions, diameter at bottom between three and four times the diameter of said inlet orifice, diameter of outlet orifice between two and three times that of the inlet orifice, and height from bottom to plane of outlet orifice three to four times the diameter of inlet orifice.

14. A nozzle comprising a bowl having a bottom, conical walls converging to an outlet orifice of substantial size, and a tangential inlet passage terminating in a primary orifice close to the junction between said bottom and sides, said primary orifice being of less diameter than the outlet orifice, and the bowl being otherwise so proportioned that the inner boundary of said primary orifice is at a distance from the axis of the bowl which is less than the radius of the outlet orifice.

15. A nozzle comprising a bowl having a bottom with a hole in its center, conical side walls converging to an outlet orifice of substantial size, and a tangential inlet passage terminating in a primary orifice close to the junction between said bottom and sides, said primary orifice being of less diameter than the outlet orifice, and the bowl being otherwise so proportioned that the inner boundary of said primary orifice is at a distance from the axis of the bowl which is less than the radius of the outlet orifice and that the radius of said bottom hole is enough less than said distance to prevent largely escape of water from such hole when the nozzle is in operation.

16. A nozzle comprising a bowl having a bottom with a hole in its center and conical side walls tapering from said bottom to an outlet orifice of relatively large diameter, and an inlet passage entering tangentially at the junction between said bottom and sides and having a diameter at the point of emission less than that of the outlet orifice and less also than the difference between the radius of the widest part of said nozzle and the radius of said hole, whereby in the operation of the nozzle water is discharged wholly or mainly through said outlet orifice and the discharge of water through said hole is inappreciable.

17. A spray nozzle comprising a hollow body of substantially circular cross section in planes perpendicular to a longitudinal line and being of larger diameter at one end than at the other, with an outlet orifice in its part of smallest diameter, and a tangentially arranged inlet, smaller in area than said outlet orifice, at the part of larger diameter, the larger end having an end wall, and such wall having a centrally located hole, the circumference of which is substantially within the inner limit of the annular path followed by the liquid passing through the nozzle.

18. A nozzle comprising a hollow body of generally circular cross section in planes transverse to a longitudinal line, said nozzle having an outlet orifice adjacent to one end, side walls convergently inclined toward said orifice, and an end wall, the side and end walls being arranged to form an open interior chamber substantially larger in diameter than the outlet orifice, and the nozzle having an inlet opening tangentially into said chamber and of an area too small to admit liquid enough to fill said chamber when free discharge from the outlet orifice is permitted, and the end wall having a drain opening in a central location and of such small diameter that the path of the liquid flowing through the nozzle in normal operation is substantially outside of the circumference of such opening.

19. A spray nozzle comprising a generally bowl-like body having a bottom wall at one end and an outlet orifice in the other end, and side walls which are convergently inclined toward the outlet orifice, the said body being formed with an open interior chamber adjacent to the larger end, which is substantially larger in diameter than the outlet orifice, and having a tangentially arranged inlet of such small area in proportion to the volume of the chamber and the discharge capacity of the nozzle that liquid forced through the nozzle will flow in an annular path in said chamber, leaving the central part thereof clear of liquid; and said end wall having a drain opening communicating with said central part and being located substantially wholly within the annular path taken by the flowing liquid.

20. A nozzle comprising essentially a bowl having an open interior with a transverse wall at one end and a discharge orifice at the other end, said orifice being of smaller area and dimensions than the bottom, and the bowl having side walls having a gradual enlargement from said orifice toward the end wall, the junction between the end and side walls being so formed as to provide a water channel of transverse curvature; and the nozzle having also an inlet passage opening tangentially of the bowl into said channel and having an enclosing partition which extends into the interior of the bowl, said channel being elevated and widened in its approach, following the circuit of water admitted to the bowl, toward the side of said partition.

21. A spray nozzle comprising a bottom wall, side walls joined to the bottom wall and extending away therefrom with a converging taper, there being an outlet orifice of substantial area surrounded by such side walls, and an inlet passage opening into the channel formed by the junction between said bottom and side walls and arranged tangentially thereof, the smallest transverse area of such inlet passage being small enough in proportion to the area of the outlet orifice to avoid filling the nozzle with water when in normal operation; said bottom wall having a hole in approximately its middle part, the radius of which is shorter than the radius of the path followed by the stream which issues from the inlet passage.

In testimony whereof I have affixed my signature.

ALFRED L. WEBRE.